(12) United States Patent
von Thal et al.

(10) Patent No.: US 7,171,028 B2
(45) Date of Patent: Jan. 30, 2007

(54) METHOD AND APPARATUS FOR COVERTLY DETERMINING THE RATE OF RELATIVE MOTION BETWEEN TWO OBJECTS

(75) Inventors: German von Thal, Santa Maria, CA (US); Gregory A. Roberts, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 756 days.

(21) Appl. No.: 10/301,950

(22) Filed: Nov. 22, 2002

(65) Prior Publication Data

US 2004/0101167 A1 May 27, 2004

(51) Int. Cl.
G06K 9/00 (2006.01)
(52) U.S. Cl. .................. 382/107; 348/154; 356/27; 73/488
(58) Field of Classification Search ............. 382/106, 382/107, 100, 103; 73/488; 356/27; 348/154
See application file for complete search history.

(56) References Cited

U.S. PATENT DOCUMENTS

| | | | |
|---|---|---|---|
| 3,917,196 A | 11/1975 | Pond et al. | |
| 4,170,773 A | 10/1979 | Fitzsimmons et al. | |
| 4,257,703 A | 3/1981 | Goodrich | |
| 4,510,525 A | 4/1985 | Kuperman et al. | |
| 4,834,531 A | 5/1989 | Ward | |
| 5,249,128 A | 9/1993 | Markandey et al. | |
| 5,267,328 A | 11/1993 | Gouge | |
| 5,479,526 A | 12/1995 | Benton et al. | |
| 5,499,784 A * | 3/1996 | Crabere et al. | ......... 244/135 A |
| 5,568,136 A | 10/1996 | Hochstein et al. | |
| 5,650,828 A | 7/1997 | Lee | |
| 5,809,161 A * | 9/1998 | Auty et al. | ................. 382/104 |
| 5,906,336 A | 5/1999 | Eckstein | |
| 6,282,301 B1 | 8/2001 | Haskett | |
| 2001/0012982 A1* | 8/2001 | Ogura et al. | ................ 701/301 |
| 2003/0007682 A1* | 1/2003 | Koshizen et al. | ........... 382/157 |

FOREIGN PATENT DOCUMENTS

| | | |
|---|---|---|
| EP | 1055939 | 11/2000 |
| GB | 2233527 | 1/1991 |
| GB | 2300082 | 10/1996 |
| RU | 2099253 | 12/1997 |

* cited by examiner

*Primary Examiner*—Vikkram Bali
*Assistant Examiner*—Anand Bhatnagar
(74) *Attorney, Agent, or Firm*—Harness Dickey & Pierce P.L.C.

(57) ABSTRACT

Apparatus and methods for covertly determining the rate of motion between a pixel-based imaging device and a target being viewed by the pixel-based imaging device. The method involves using the pixel-based imaging device to acquire a first and a second digital image of the target. The second digital image is acquired a time interval after the first digital image. The time interval and pixel counts for the pixel set within the first and the second digital image representing a particular portion of the target are then used to determine a rate of relative motion between the pixel-based imaging device and the target. Advantageously, the rate of relative motion is determined covertly such that the locations of the pixel-based imaging device and the target are not disclosed or broadcast to third parties.

20 Claims, 3 Drawing Sheets

METHOD AND APPARATUS FOR COVERTLY DETERMINING THE RATE OF RELATIVE MOTION BETWEEN TWO OBJECTS

FIELD OF THE INVENTION

The present invention relates generally to pixel-based imaging devices, and more particularly to apparatus and methods for covertly determining the rate of relative motion between two objects with a pixel-based imaging device, such as a pixel-based imaging device system.

BACKGROUND OF THE INVENTION

During aerial refueling operations, the rate of closure between a tanker aircraft and a receiver aircraft must be controlled to ensure that excessive rates of closure do not jeopardize the safety of the aircraft and their crews. For at least this reason, it sometimes becomes necessary for a boom operator and/or a pilot to cancel a refueling sortie when the rate of closure becomes excessive.

An inexperienced receiver aircraft pilot, for example during aerial refueling training, may have difficulty in subjectively determining the appropriate airspeed at which to approach the tanker aircraft to maintain an acceptable rate of closure between the tanker and receiver aircraft. Accordingly, the training envelope during such sorties can be expanded by providing rate of closure information to both the boom operator and the receiver aircraft pilot.

SUMMARY OF THE INVENTION

Accordingly, a need remains in the art for a device and method for determining the rate of relative motion between two objects that can be implemented, tested, and maintained in a cost efficient and low risk manner. More particularly, there is a need for a device and method for determining the rate of closure between a tanker aircraft and a receiver aircraft during aerial refueling operations. Ideally, the rate of closure determination would be performed covertly and thus not disclose or broadcast the aircrafts' location to third parties.

The present invention is directed to a system and method for covertly determining the rate of motion between a pixel-based imaging device and a target being viewed by the pixel-based imaging device. The method generally involves using the pixel-based imaging device to acquire a first and a second digital image of the target. The second digital image is acquired a time interval after the first digital image. The time interval and pixel counts for the pixel set within the first and the second digital image representing a particular portion of the target are then used to determine a rate of relative motion between the pixel-based imaging device and the target. Advantageously, the rate of relative motion is determined covertly such that the locations of the pixel-based imaging device and the target are not disclosed or broadcast to third parties.

Further areas of applicability of the present invention will become apparent from the detailed description provided hereinafter. It should be understood that the detailed description and specific examples, while indicating at least one preferred embodiment of the invention, are intended for purposes of illustration only and are not intended to limit the scope of the invention.

BRIEF DESCRIPTION OF THE DRAWINGS

The present invention will be more fully understood from the detailed description and the accompanying drawings, wherein.

Corresponding reference characters indicate corresponding features throughout the drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
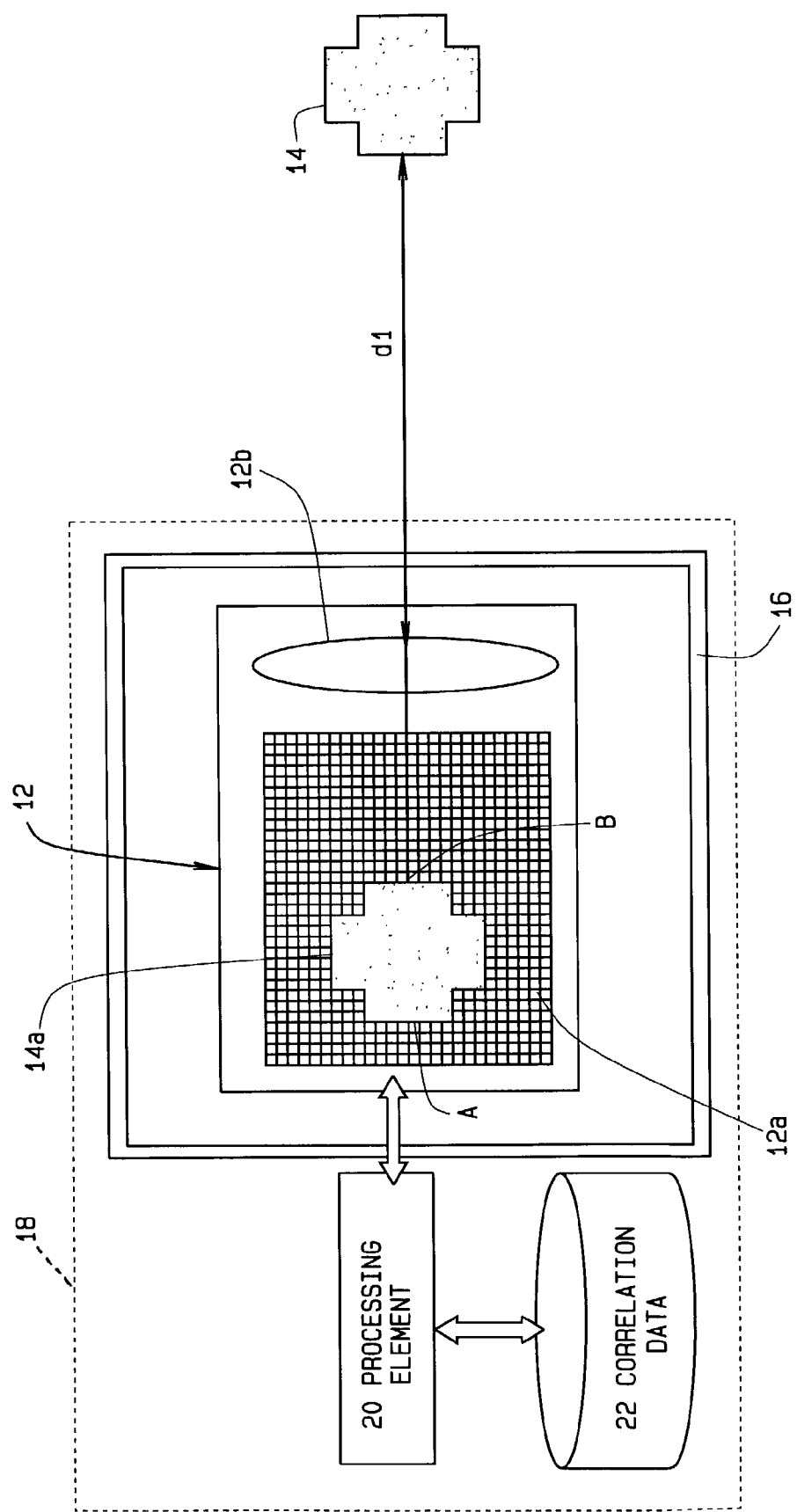
FIG. 1 is a simplified block diagram of a system in accordance with a preferred embodiment of the present invention illustrating a pixel-based imaging device supported on a mounting platform, wherein the pixel-based imaging device has captured a first digital image of a target.

Referring to FIG. 1, there is shown a digital imaging system 10 in accordance with a preferred embodiment of the present invention. Generally, the system 10 includes at least one pixel-based imaging device 12 which is directed or aimed at a target 14. The pixel-based imaging device 12 may comprise any one of wide range of devices capable of capturing pixel-based images (i.e., images formed by one or more pixels). By way of example only, the pixel-based imaging device 12 may comprise a digital camera, an infrared camera, LADAR (laser detecting and ranging) camera, among others.

The pixel-based imaging device 12 is mounted on a platform 16, which is in turn supported on a different structure or platform 18, such as possibly an aircraft, ship, bus or other motor vehicle, or even a stationary support surface. Accordingly, while it will be appreciated that the present invention will have particular utility with regard to use on mobile platforms such as refueling aircraft, the invention is not so limited and may be used in connection with fixed (i.e., ground-based) support structures.

The system 10 further includes a suitable processing element 20 for performing the various operations required by the present invention. The processing element 20 is typically comprised of a combination of hardware (e.g., one or more microprocessors, other processing devices) and software that is stored by memory and executed by the hardware. However, it should be understood that the processing element 20 can be comprised of other combinations of hardware, software, firmware or the like.

The processor 20 is in communication with the pixel-based imaging device 12. The processing element 20 may be mounted on the platform 16 along with the pixel-based imaging device 12, or it may be mounted on the platform 18, or even remotely from the platform 18.

Figure 2:
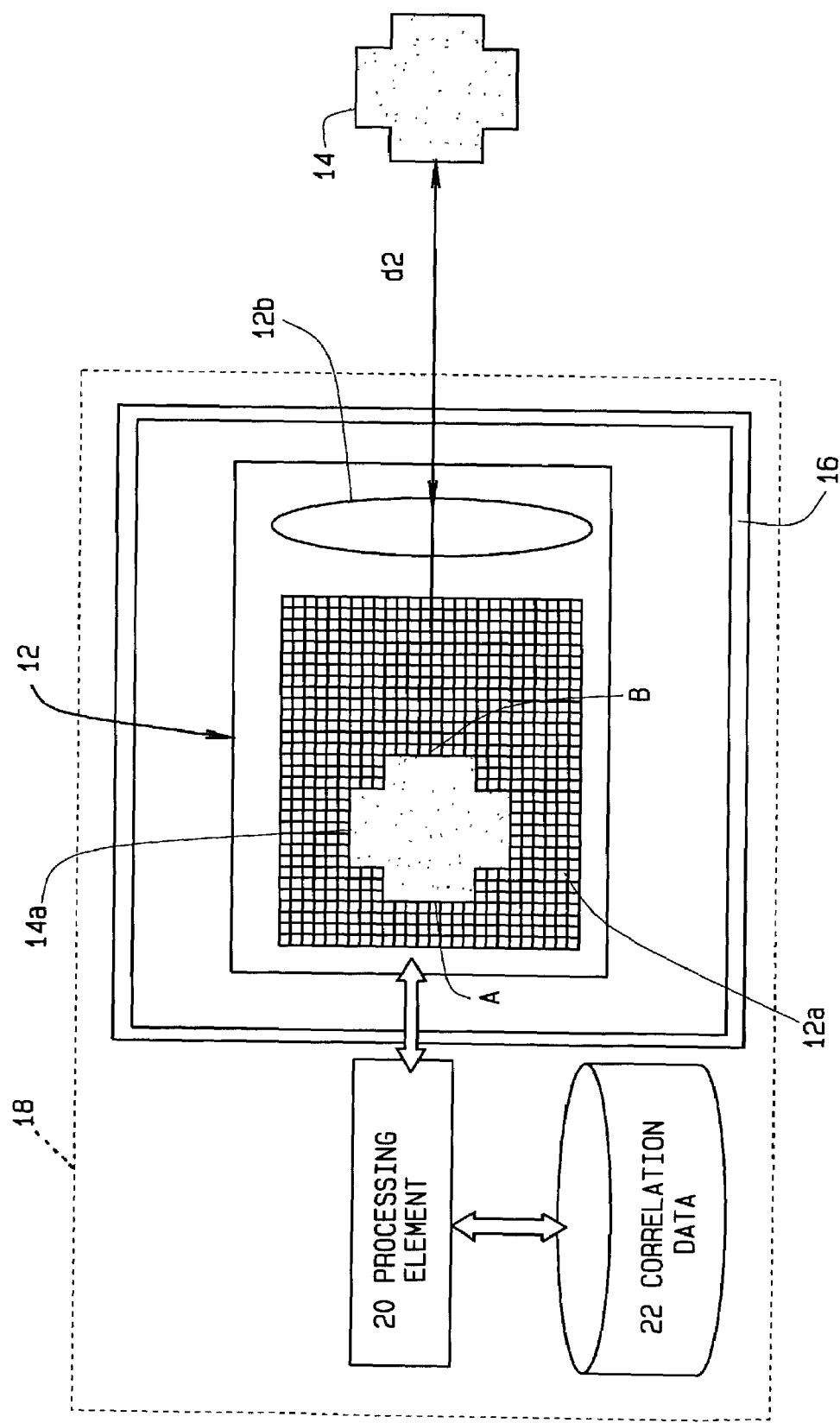
FIG. 2 is another simplified block diagram of the system shown in FIG. 1, wherein the pixel-based imaging device has captured a second digital image of the target at a later time when the pixel-based imaging device was positioned closer to the target.

In operation, the pixel-based imaging device 12 produces images of the target 14, such as the images 14a and 14b shown respectively in FIGS. 1 and 2. The images 14a and 14b are painted in the pixel array 12a of the pixel-based imaging device 12. However, and as will be described in greater detail below, the image 14a occupies less pixels than the image 14b because the image 14b was captured by the pixel-based imaging device 12 at a time when the pixel-based imaging device 12 was closer to the target 14 (i.e., d2<d1). It will be appreciated that the target 14, when viewed as a digital image (e.g., 14a, 14b), will typically be represented by hundreds, or perhaps thousands, of pixels, depending on the resolution of the pixel-based imaging device 12.

Figure 3:
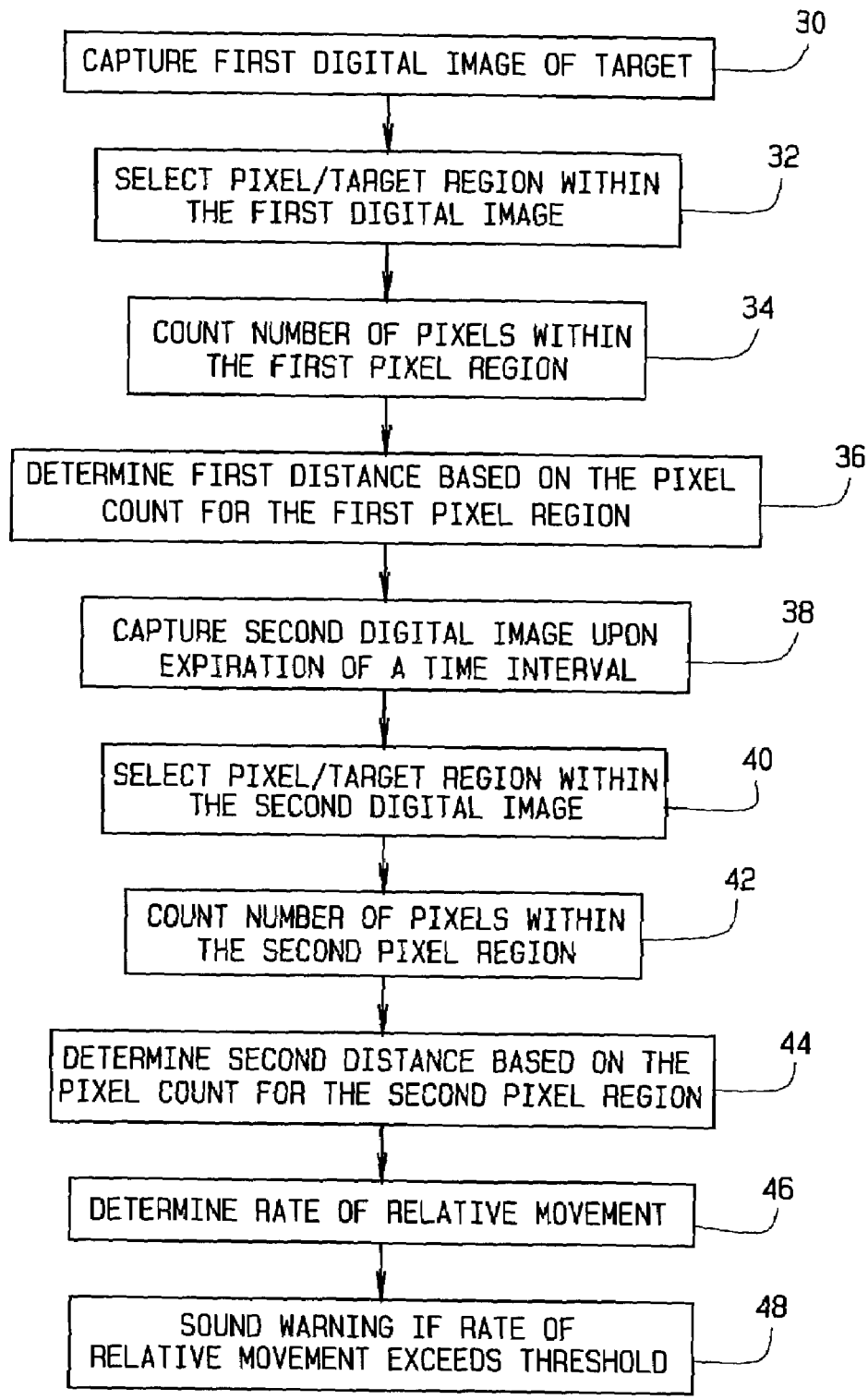
FIG. 3 is a flowchart of the steps performed by a method of the present invention in determining a rate of relative motion between the pixel-based imaging device and the target shown in FIG. 1.

Referring to FIG. 3, a preferred method 28 implemented by the system 10 of the present invention is illustrated in simplified flow chart form. The method 28 involves using the pixel-based imaging device 12 to capture a first digital image 14a of the target 14, as indicated at step 30. At step 32, a first pixel set or region is selected from the first digital image 14a by the processor 20. The first pixel set indicates at least a portion of the target 14, such as the pixels captured between points A and B or the pixels representing the target 14 in its entirety. The selection of the first pixel set is preferably based upon pixel information content. For example, the first pixel set may comprise each pixel within the pixel array 12a that contains certain image data, such as a particular gray scale value, a particular set of red, green, and blue tristimulus values, among other image data.

At step 34, the processor 20 determines a pixel count for the first pixel set. That is, the processor 20 counts each of the pixels comprising the first pixel set. Then, at step 36, the processor 20 determines the first distance d1 (i.e., the distance separating the lens 12b of the pixel-based imaging device 12 from the target 14 when the digital image 14a is captured) from the pixel count for the first pixel set. The distance determination is based upon the number of pixels counted for the first pixel set and one or more dimensions of the target 14. To allow the processor 20 to determine distances from pixel counts, the system 10 includes a database 22 that contains information correlating pixel counts to distances. Accordingly, the processing element 20 accesses the database 22 at step 36 when determining the first distance d1.

At step 38, the pixel-based imaging device 12 is used to capture a second digital image 14b of the target 14. The second digital image 14b is captured upon the expiration of a predetermined amount of time ($\Delta t$) after the first digital image 14a was acquired. The time interval ($\Delta t$) may comprise any one of a wide range of time intervals (e.g., 1 millisecond, 1 second, etc.) and may depend at least in part on the particular application in which the system 10 is being used.

At step 40, the processor 20 selects a second pixel set or region from the digital image 14b. The second pixel set indicates or represents the identical portion of the target 14 as did the first pixel set selected at step 32. The processor 20 determines a pixel count for the second pixel set by counting the pixels comprising the second pixel set at step 42. At step 44, the processing element 20 accesses the database 22 and uses the pixel count for the second pixel set to determine the distance d2 (i.e., the distance separating the lens 12b of the pixel-based imaging device 12 from the target 14 when the digital image 14b is captured).

As shown, the distance d2 is less than the distance d1, and the number of pixels comprising the second pixel set is greater than the number of pixels comprising the first pixel set. It should be noted, however, that if the target 14 and pixel-based imaging device 12 are moving away from each other, the distance d2 would be greater than the distance d1. In which case, the number of pixels comprising the second pixel set would be less than the number of pixels comprising the first pixel set.

At step 46, the processing element 20 determines the rate of relative motion (e.g., rate of closure, rate of separation) between the pixel-based imaging device 12 and the target 14. To do so, the processing element 20 divides the difference between the distances d1 and d2 by the time interval (i.e., rate of relative motion is equal to $(d1-d2)/\Delta t$). If the rate of relative motion determined at step 46 exceeds a threshold level, the system 10 provides a speed warning at step 48.

Steps 30 through 48 may then be repeated as necessary. Indeed, the rate of relative motion is preferably determined periodically over short time intervals to allow for substantially continuous monitoring of the relative motion rate.

In another embodiment, the system 10 uses the pixels counts from steps 34 and 42 to determine a pixel count change (e.g., pixel count increase or decrease from the first to the second pixel set) instead of using the pixel counts to determine the first and second distances d1 and d2, as was the case in the method 28. Then, the system 10 accesses the database 22 to determine a differential distance ($\Delta d$) associated with the pixel count change. Next, the system 10 computes the rate of relative motion by dividing the differential distance by the time interval (i.e., rate of relative motion=$\Delta d/\Delta t$).

By way of example only, the pixel-based imaging device 12 may be disposed or mounted on board a receiver aircraft and the target 14 may comprise a boom tip of a tanker aircraft. In such an embodiment, the system 10 is used to covertly determine the closure rate between the tanker aircraft and the receiving aircraft during an aerial refueling operation. Preferably, the rate of closure is determined intermittently over short time intervals to allow for substantially continuous monitoring of the rate of closure as the receiver aircraft approaches the tanker aircraft. The rate of closure may then be provided to the boom operator and/or the pilot(s) of either or both of the tanker and receiver aircraft. Alternatively, or additionally, the system 10 may provide a speed warning to the boom operator and/or the pilots when the rate of closure exceeds a certain maximum threshold value.

Providing rate of closure information during aerial refueling training operations allows for substantial cost reductions in flight test development, training, and operations. Because inexperienced pilots may have difficulty in subjectively determining the appropriate airspeed at which to approach the tanker aircraft so as to not create an excessive rate of closure between the tanker and receiver aircraft, the use of the present invention will result in higher test success rates (i.e., less aborted refueling sequences due to excessive rates of closure). Accordingly, the present invention allows for increased refueling effectiveness during refueling training and operations.

Moreover, the rate of relative motion is covertly determined by the present invention and thus does not disclose or broadcast the aircrafts' location to third parties, as may happen with other non-covert aerial refueling processes (e.g., RADAR (radio detecting and ranging) and LADAR (laser detecting and ranging)). The present invention's use of digital image capture technology instead of a laser system also eliminates the risk of eye injury from improper laser usage.

In addition, the present invention is far less costly to produce, modify, test, and maintain than other costly sensors used during aerial refueling operations such as RADAR and LADAR. Indeed, the present invention can be implemented by using existing hardware and software technologies, such as the pixel-based imaging devices already onboard aircraft.

The present invention can be implemented, tested, maintained, and operated in a cost efficient and low risk manner, and thus provides significant life cycle cost (LCC) savings to the user. Moreover, the present invention allows for improved factory-to-market schedules in that it does not require the building of either calibration or simulation facilities.

While it will be appreciated that the present invention will find particularly utility in connection with military tanker aircraft employing a refueling boom, it is anticipated that the invention will be applicable to any of a wide range of other mobile platforms such as busses, ships and other land, sea, air and space vehicles where determinations of rate of relative motion are needed. The present invention is further not limited to mobile platforms, but may also be used in connection with ground-based structures where determinations of rate of relative motion are needed. Accordingly, the specific references to aircraft herein should not be construed as limiting the scope of the present invention, as the invention could be applied in any implementation where a determination as to the rate of relative motion between two objects would be beneficial regardless of whether both objects are mobile or only one object is mobile and the other is fixed. For example, it is anticipated that the invention will be applicable to industrial applications (e.g., manufacturing, warehousing, material handling, etc.) for determining closure rate between vehicles, parts, and/or for providing speed warnings. Even further, the present invention could also be readily adapted for law enforcement purposes in monitoring vehicle speeds along roadways regardless of whether the law enforcement vehicle is stationary or moving.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A method for determining a rate of relative motion between a moving target and a pixel-based imaging device, the method comprising:
    acquiring a first digital image of the moving target with the pixel-based imaging device;
    selecting a first pixel set from the first digital image having at least one particular data value representing at least a portion of the moving target, and determining the pixel count of the first pixel set;
    using the pixel count for the first pixel set to determine a first distance separating the pixel-based imaging device and the moving target when the first digital image was acquired;
    acquiring a second digital image of the moving target with the pixel-based imaging device after expiration of a time interval;
    selecting a second pixel set from the second digital image having at least one particular data value representing at least a portion of the moving target, and determining the pixel count of the second pixel set;
    using the pixel count for the second pixel set to determine a second distance separating the pixel-based imaging device and the moving target when the second digital image was acquired;
    using the difference between the first and second distances in the first and second digital images and the time interval to determine a rate of relative motion between the pixel-based imaging device and the moving target.

2. The method of claim 1, wherein determining a rate of relative motion between the pixel-based imaging device and the moving target by using the first and second distances and the time interval comprises subtracting the second distance from the first distance and then dividing by the time interval.

3. The method of claim 1, wherein:
    using the pixel count for the first pixel set to determine a first distance separating the pixel-based imaging device and the moving target when the first digital image was acquired comprises accessing correlation data; and
    using the pixel count for the second pixel set to determine a second distance separating the pixel-based imaging device and the moving target when the second digital image was acquired comprises accessing the correlation data.

4. The method of claim 1, wherein the rate of relative motion is a rate of closure between the pixel-based imaging device and the target.

5. The method of claim 1, wherein the rate of relative motion is a rate of separation of the pixel-based imaging device from the target.

6. The method of claim 1, further comprising displaying the rate of relative motion to a user.

7. The method of claim 1, further comprising providing a speed warning to a user when the rate of relative motion exceeds a threshold level.

8. The method of claim 1, wherein:
    the target is disposed on a first platform; and
    the pixel-based imaging device is disposed on a second platform.

9. The method of claim 1, wherein:
    the target is disposed on an aircraft; and
    the pixel-based imaging device is disposed on another aircraft.

10. The method of claim 1, wherein the selections of the first and second pixel sets are at least partially based on pixel information content.

11. The method of claim 10, wherein the pixel information content comprises image data.

12. A method for determining a rate of relative motion between a moving target and a pixel-based imaging device, the method comprising:
    acquiring a first digital image of the target with the pixel-based imaging device;
    selecting a first pixel set from the first digital image having data content representing at least a portion of the target, and determining the pixel count of the first pixel set;
    acquiring a second digital image of the target with the pixel-based imaging device after expiration of a time interval;
    selecting a second pixel set from the second digital image having data content representing at least a portion of the target, and determining the pixel count of the second pixel set;
    determining a pixel count change for at least a portion of the target as represented in the first digital image and the second digital image; and
    using the pixel count change and the time interval to derive the rate of relative motion.

13. The method of claim 12, wherein using the pixel count change and the time interval to derive the rate of relative motion comprises:
    accessing correlation data to determine a differential distance associated with the pixel count change; and dividing the differential distance by the time interval.

14. A system for determining a rate of relative motion between a moving target and an object, the system comprising:
- a pixel-based imaging device disposed on the object, the pixel-based imaging device acquiring a first and a second digital image of the moving target, the second digital image being acquired after expiration of a time interval from when the first digital image was acquired; and
- a computer executable module for using a number of pixels in a first pixel set and a second pixel set, selected from the first and second digital images, respectively, which pixel sets have data content representing at least a portion of the target in each of the first and second digital images, and the time interval, to determine a rate of relative motion between the pixel-based imaging device and the moving target.

15. The system of claim 14, further comprising at least one database including data correlating pixels counts with distances.

16. The system of claim 14, wherein the computer executable module comprises:
- a computer executable sub-module for selecting a first pixel set from the first digital image, the first pixel set having a data content representing at least a portion of the moving target;
- a computer executable sub-module for determining a pixel count for the first pixel set;
- a computer executable sub-module for using the pixel count for the first pixel set to determine a first distance separating the pixel-based imaging device and the moving target when the first digital image was acquired;
- a computer executable sub-module for selecting a second pixel set from the second digital image, the second pixel set having a data content representing the at least a portion of the moving target;
- a computer executable sub-module for determining a pixel count for the second pixel set;
- a computer executable sub-module for using the pixel count for the second pixel set to determine a second distance separating the pixel-based imaging device and the moving target when the second digital image was acquired; and
- a computer executable sub-module for determining a rate of relative motion between the pixel-based imaging device and the moving target by subtracting the second distance from the first distance and then dividing by the time interval.

17. The system of claim 14, wherein the computer executable module comprises:
- a computer executable sub-module for determining a pixel count change for at least a portion of the moving target as represented in the first digital image and the second digital image; and
- a computer executable sub-module for using the pixel count change and the time interval to derive the rate of relative motion.

18. The system of claim 14, wherein the pixel-based imaging device comprises a digital camera.

19. Apparatus for determining a rate of relative motion between a pixel-based imaging device and a moving target, the apparatus comprising a computer executable module for using pixels in a plurality of pixel sets selected from a plurality of digital images that are made up from the pixel sets, one of the digital images being acquired in time before the other,
- the pixel sets each having a data content representing at least a portion of the target in the plurality of digital images of the target produced by the pixel-based imaging device to determine, together with a time interval separating the acquisition of the plurality of digital images, a rate of relative motion between the pixel-based imaging device and the target.

20. An aircraft, comprising:
- a pixel-based imaging device for acquiring a first digital image and a second digital image of at least portions of a moving mobile platform, the second digital image being acquired after expiration of a time interval from when said first digital image was acquired; and
- a computer executable module for using a plurality of pixels in a first pixel set making up a portion of the first digital image, and a plurality of pixels in a second pixel set making up a portion of the second digital image, which pixel sets each represent at least a portion of the moving mobile platform in the first and second digital images, and the time interval, determine a rate of relative motion between the aircraft and the moving mobile platform.

* * * * *